United States Patent
Xu et al.

(10) Patent No.: US 12,444,296 B2
(45) Date of Patent: Oct. 14, 2025

(54) BIDIRECTIONAL TRANSMISSION CIRCUIT FOR UNIVERSAL SIGNAL

(71) Applicant: SHANGHAI CHENZHU INSTRUMENT CO., LTD., Shanghai (CN)

(72) Inventors: Min Xu, Shanghai (CN); Gang Du, Shanghai (CN); Fan He, Shanghai (CN); Xi Fang, Shanghai (CN)

(73) Assignee: SHANGHAI CHENZHU INSTRUMENT CO., LTD., Shanghai (CN)

( * ) Notice: Subject to any disclaimer, the term of this patent is extended or adjusted under 35 U.S.C. 154(b) by 234 days.

(21) Appl. No.: 18/274,920

(22) PCT Filed: Mar. 15, 2021

(86) PCT No.: PCT/CN2021/080859
§ 371 (c)(1),
(2) Date: Jul. 28, 2023

(87) PCT Pub. No.: WO2022/160423
PCT Pub. Date: Aug. 4, 2022

(65) Prior Publication Data
US 2024/0113634 A1    Apr. 4, 2024

(30) Foreign Application Priority Data
Jan. 28, 2021 (CN) .......................... 202110120265.5

(51) Int. Cl.
*G08C 19/02* (2006.01)
*H02M 3/335* (2006.01)

(52) U.S. Cl.
CPC ........ *G08C 19/02* (2013.01); *H02M 3/33561* (2013.01)

(58) Field of Classification Search
CPC .......................... G08C 19/02; H02M 3/33561
See application file for complete search history.

(56) References Cited

U.S. PATENT DOCUMENTS

| 4,292,633 A * | 9/1981 | Goodwin, Jr. ......... G08C 19/02 |
| | | 363/124 |
| 5,712,631 A | 1/1998 | Lewis et al. |

(Continued)

FOREIGN PATENT DOCUMENTS

| CN | 201134155 Y | 10/2008 |
| CN | 201172564 Y | 12/2008 |

(Continued)

OTHER PUBLICATIONS

English translation of EP0658866A1 by Clarivate Analytics, May 2025, 5 pages.*

(Continued)

*Primary Examiner* — Harry R Behm
(74) *Attorney, Agent, or Firm* — Dickinson Wright PLLC

(57) ABSTRACT

A bidirectional transmission circuit for a universal signal, comprising an intrinsically safe energy limiting module, a first signal coupling module, an isolation transformer module, a second signal coupling module and a control module; the first signal coupling module adjusts a first direct current signal of a universal signal to a first alternating current signal, the isolation transformer module transmits the first alternating current signal to the second signal coupling module in an isolation manner, and the second signal coupling module adjusts the first alternating current signal to a second direct current signal to a universal signal receiving terminal; the second signal coupling module further adjusts a third direct current signal of a control signal to a second alternating current signal, and the first signal coupling module further adjusts the second alternating current signal (Continued)

to a fourth direct current signal to a control signal receiving terminal.

16 Claims, 5 Drawing Sheets

(56) References Cited

U.S. PATENT DOCUMENTS

| | | |
|---|---|---|
| 6,317,056 B1 | 11/2001 | Klumpp et al. |
| 2009/0243765 A1 | 10/2009 | Blanke et al. |

FOREIGN PATENT DOCUMENTS

| | | | | |
|---|---|---|---|---|
| CN | 102081837 | A | 6/2011 | |
| CN | 102087508 | A | 6/2011 | |
| CN | 104237786 | A | 12/2014 | |
| CN | 104868732 | A | 8/2015 | |
| CN | 105730393 | A | 7/2016 | |
| CN | 106160554 | A | 11/2016 | |
| CN | 207233186 | U | 4/2018 | |
| CN | 110070905 | A | 7/2019 | |
| DE | 0658866 | A1 * | 6/1995 | ............ G08C 19/02 |
| JP | 2009003816 | A | 1/2009 | |
| WO | 2016180499 | A1 | 11/2016 | |

OTHER PUBLICATIONS

First Office Action with English Translation for Chinese Application No. 202110120265.5, dated Jul. 14, 2022, 14 pages.
International Search Report with English Translation and Written Opinion for PCT Application No. PCT/CN2021/080859, dated Jun. 29, 2021, 14 pages.
First Office Action with English Translation for Japanese Application No. 2023-540858, dated Sep. 10, 2024, 6 pages.

* cited by examiner

BIDIRECTIONAL TRANSMISSION CIRCUIT FOR UNIVERSAL SIGNAL

CROSS-REFERENCE TO RELATED APPLICATIONS

This is a National Stage Application, filed under 35 U.S.C.371 based on International Patent Application No. PCT/CN2021/080859, filed Mar. 15, 2021, which claims priority to Chinese Patent Application No. 202110120265.5 filed Jan. 28, 2021, the disclosures of which are incorporated herein by reference in their entireties.

TECHNICAL FIELD

Embodiments of the present application relate to the field of isolation transmission of universal signals, for example, to a bidirectional transmission circuit for a universal signal.

BACKGROUND

In an industrial control system, isolation technology is used in the industrial control field. In the industrial control field, various types of signals need to be detected and transmitted, and lots of pressure sensors, temperature sensors, positioning valves, solenoid valves or proximity switches are used. The conventional signals generated by field devices and the signals of the programmable logic controller (PLC)/distributed control system (DCS) interfere with each other in the bidirectional transmission, resulting in instability of the system. Some special hazardous situations require the use of safe barriers. To ensure the stable and reliable operation of the system, most of the systems use isolators or isolated safe barriers to convert signals so that the input and the output are isolated from each other, improving the anti-interference capability. However, the configuration of various safe barriers through a multi-path circuit to distinguish and isolate transmission signals not only increases the cost of the industrial control system, but also affects the applicability of the control system.

SUMMARY

Embodiments of the present application provide a bidirectional transmission circuit for a universal signal to solve the problems of the high cost and the compromised applicability of the control system caused by the configuration of various safe barriers through a multi-path circuit to distinguish and isolate transmission signals in the related art.

The embodiments of the present application provide a bidirectional transmission circuit for a universal signal. The bidirectional transmission circuit includes a power supply module and a bidirectional transmission module. The bidirectional transmission module includes an intrinsically safe energy limiting module, a first signal coupling module, an isolation transformer module, a second signal coupling module and a control module. The first signal coupling module is electrically connected to the intrinsically safe energy limiting module and the isolation transformer module, and the second signal coupling module is electrically connected to the isolation transformer module and the control module. The power supply module is electrically connected to the intrinsically safe energy limiting module, the first signal coupling module, the second signal coupling module and the control module. The intrinsically safe energy limiting module includes a control signal receiving terminal and at least one universal signal input terminal. The control signal receiving terminal is configured to receive a control signal, and each universal signal input terminal is configured to input a universal signal. The control module includes a control signal output terminal and a universal signal receiving terminal. The control signal output terminal is configured to output the control signal, and the universal signal receiving terminal is configured to receive the universal signal. The first signal coupling module is configured to adjust a first direct current signal of the universal signal to be a first alternating current signal, the isolation transformer module is configured to transmit the first alternating current signal to the second signal coupling module in an isolation manner, and the second signal coupling module is configured to adjust the first alternating current signal to be a second direct current signal and transmit the second direct current signal to the universal signal receiving terminal. The second signal coupling module is further configured to adjust a third direct current signal of the control signal to be a second alternating current signal, the isolation transformer module is further configured to transmit the second alternating current signal to the first signal coupling module in an isolation manner, and the first signal coupling module is further configured to adjust the second alternating current signal to be a fourth direct current signal and transmit the fourth direct current signal to the control signal receiving terminal.

Optionally, the first signal coupling module includes a first filtering unit, a first alternating current-direct current conversion unit and a direct current-alternating current conversion unit. The second signal coupling module includes a second filtering unit, a second alternating current-direct current conversion unit and the direct current-alternating current conversion unit. The first filtering unit and the second filtering unit are each configured to filter the universal signal and the control signal. The first alternating current-direct current conversion unit is configured to adjust the second alternating current signal to be the fourth direct current signal and transmit the fourth direct current signal to the control signal receiving terminal. The second alternating current-direct current conversion unit is configured to adjust the first alternating current signal to the second direct current signal and transmit the second direct current signal to the universal signal receiving terminal. The direct current-alternating current conversion unit is configured to adjust the first direct current signal of the universal signal to be the first alternating current signal and adjust the third direct current signal of the control signal to be the second alternating current signal.

Optionally, the first filtering unit includes a first capacitor and a second capacitor. The first terminal of the first capacitor is electrically connected to each universal signal input terminal, and the second terminal of the first capacitor is electrically connected to the control signal receiving terminal. The first terminal of the second capacitor is electrically connected to each universal signal input terminal, and the second terminal of the second capacitor is electrically connected to the control signal receiving terminal. The first alternating current-direct current conversion unit includes a third capacitor and a fourth capacitor. The direct current-alternating current conversion unit includes a first inductor, a second inductor, a fifth capacitor, a first diode, a second diode, a first transistor and a second transistor. The first terminal of the third capacitor is electrically connected to each universal signal input terminal, the first terminal of the first transistor, the control terminal of the first transistor and the anode of the first diode, and the second terminal of the third capacitor is electrically connected to the first terminal of the fourth capacitor and the first terminal of the isolation transformer module. The second terminal of the fourth capacitor is electrically connected to the control signal receiving terminal, the first terminal of the second transistor, the control terminal of the second transistor, the cathode of the second diode, the first terminal of the second inductor and the first terminal of the fifth capacitor. The first terminal of the first inductor is electrically connected to the second terminal of the isolation transformer module, and the second terminal of the first inductor is electrically connected to the second terminal of the second inductor, the second terminal of the fifth capacitor, the second terminal of the first transistor and the second terminal of the second transistor. The cathode of the first diode is electrically connected to the anode of the second diode. The second filtering unit includes a third inductor, a fourth inductor, a sixth capacitor and a seventh capacitor. The first terminal of the third inductor is electrically connected to the universal signal receiving terminal and the first terminal of the sixth capacitor, and the second terminal of the third inductor is electrically connected to the first terminal of the seventh capacitor. The first terminal of the fourth inductor is electrically connected to the control signal output terminal and the second terminal of the sixth capacitor, and the second terminal of the fourth inductor is electrically connected to the second terminal of the seventh capacitor. The second alternating current-direct current conversion unit includes an eighth capacitor, a ninth capacitor, a third diode and a fourth diode. The first terminal of the eighth capacitor is electrically connected to the second terminal of the third inductor and the cathode of the third diode, and the second terminal of the eighth capacitor is electrically connected to the first terminal of the ninth capacitor and the third terminal of the isolation transformer module. The second terminal of the ninth capacitor is electrically connected to the second terminal of the fourth inductor and the anode of the fourth diode. The anode of the third diode and the cathode of the fourth diode are each electrically connected to the fourth terminal of the isolation transformer module.

Optionally, the direct current-alternating current conversion unit further includes a first resistor, a second resistor, a tenth capacitor and an eleventh capacitor. The first resistor is arranged in series between the control terminal of the first transistor and the first terminal of the first transistor. The second resistor is arranged in series between the control terminal of the second transistor and the first terminal of the second transistor. The first terminal of the tenth capacitor is electrically connected to the first terminal of the first resistor, and the second terminal of the tenth capacitor is electrically connected to the cathode of the first diode and the anode of the second diode, respectively. The eleventh capacitor is arranged in series between the first terminal of the second inductor and the control terminal of the second transistor.

Optionally, the bidirectional transmission circuit further includes a signal identification module. The signal identification module is arranged in parallel with the first signal coupling module. The signal identification module includes at least two comparison units. The negative phase input terminal of each of the at least two comparison units is electrically connected to the output terminal of the intrinsically safe energy limiting module, and reference signals input to positive phase input terminals of any two comparison units are different.

Optionally, the universal signal includes an intrinsically safe analog input signal AI, an intrinsically safe analog output signal AO, an intrinsically safe digital input signal DI and an intrinsically safe digital output signal DO. The at least two comparison units include a first comparison unit, a second comparison unit, a third comparison unit and a signal decoding unit. The first comparison unit includes a first negative phase input terminal and a first positive phase input terminal, and the first comparison unit is configured to compare the universal signal with a first reference signal to obtain a first comparison signal and transmit the first comparison signal to the signal decoding unit. The second comparison unit includes a second negative phase input terminal and a second positive phase input terminal, and the second comparison unit is configured to compare the universal signal with a second reference signal to obtain a second comparison signal and transmit the second comparison signal to the signal decoding unit. The third comparison unit includes a third negative phase input terminal and a third positive phase input terminal, and the third comparison unit is configured to compare the universal signal with a third reference signal to obtain a third comparison signal and transmit the third comparison signal to the signal decoding unit. The signal decoding unit is configured to determine the type of the universal signal according to the first comparison signal, the second comparison signal and the third comparison signal. The first reference signal, the second reference signal and the third reference signal are successively decreased.

Optionally, the first comparison unit includes a first comparator, a first comparison resistor and a second comparison resistor. The first terminal of the first comparison resistor is electrically connected to a first voltage signal input terminal, the first terminal of the second comparison resistor is grounded, the second terminal of the first comparison resistor, the second terminal of the second comparison resistor and the positive phase input terminal of the first comparator are electrically connected, the negative phase input terminal of the first comparator is electrically connected to the output terminal of the intrinsically safe energy limiting module, and the output terminal of the first comparator is electrically connected to the signal decoding unit. The second comparison unit includes a second comparator, a third comparison resistor and a fourth comparison resistor. The first terminal of the third comparison resistor is electrically connected to the first voltage signal input terminal, the first terminal of the fourth comparison resistor is grounded, the second terminal of the third comparison resistor, the second terminal of the fourth comparison resistor and the positive phase input terminal of the second comparator are electrically connected, the negative phase input terminal of the second comparator is electrically connected to the output terminal of the intrinsically safe energy limiting module, and the output terminal of the second comparator is electrically connected to the signal decoding unit. The third comparison unit includes a third comparator, a fifth comparison resistor and a sixth comparison resistor. The first terminal of the fifth comparison resistor is electrically connected to the first voltage signal input terminal, the first terminal of the sixth comparison resistor is grounded, the second terminal of the fifth comparison resistor, the second terminal of the sixth comparison resistor and the positive phase input terminal of the third comparator are electrically connected, the negative phase input terminal of the third comparator is electrically connected to the output terminal of the intrinsically safe energy limiting module, and the output terminal of the third comparator is electrically connected to the signal decoding unit. The first voltage signal input terminal is electrically connected to the power supply module.

Optionally, the first comparison unit further includes a first pull-up resistor, a third resistor, a fourth resistor and a twelfth capacitor. The first terminal of the first pull-up resistor is electrically connected to the first voltage signal input terminal, the second terminal of the first pull-up resistor and the first terminal of the third resistor are electrically connected to the output terminal of the first comparator, the second terminal of the third resistor is electrically connected to the second terminal of the second comparison resistor, the first terminal of the fourth resistor is electrically connected to the negative phase input terminal of the first comparator, the second terminal of the fourth resistor is electrically connected to the output terminal of the intrinsically safe energy limiting module, the first terminal of the twelfth capacitor is electrically connected to the first bias voltage input terminal of the first comparator, the second terminal of the twelfth capacitor is grounded, and the second bias voltage input terminal of the first comparator is grounded. The second comparison unit further includes a second pull-up resistor, a fifth resistor and a sixth resistor. The first terminal of the second pull-up resistor is electrically connected to the first voltage signal input terminal, the second terminal of the second pull-up resistor and the first terminal of the fifth resistor are electrically connected to the output terminal of the second comparator, the second terminal of the fifth resistor is electrically connected to the second terminal of the fourth comparison resistor, the first terminal of the sixth resistor is electrically connected to the negative phase input terminal of the second comparator, and the second terminal of the sixth resistor is electrically connected to the output terminal of the intrinsically safe energy limiting module. The third comparison unit further includes a third pull-up resistor, a seventh resistor and an eighth resistor. The first terminal of the third pull-up resistor is electrically connected to the first voltage signal input terminal, the second terminal of the third pull-up resistor and the first terminal of the seventh resistor are electrically connected to the output terminal of the third comparator, the second terminal of the seventh resistor is electrically connected to the second terminal of the sixth comparison resistor, the first terminal of the eighth resistor is electrically connected to the negative phase input terminal of the third comparator, and the second terminal of the eighth resistor is electrically connected to the output terminal of the intrinsically safe energy limiting module.

Optionally, the power supply module includes a power supply, a voltage regulator module, a voltage converter module, a first rectifier module and a second rectifier module. The power supply is configured to provide a direct current power signal. The voltage regulator module is configured to stably output the direct current power signal. The voltage converter module is configured to convert the direct current power signal into an alternating current power signal. The first rectifier module and the second rectifier module are each configured to rectify the alternating current power signal into a direct current signal. The first rectifier module has a first voltage, and the first rectifier module is configured to provide power for the intrinsically safe energy limiting module and the first signal coupling module. The second rectifier module has a second voltage, and the second rectifier module is configured to provide power for the second signal coupling module and the control module.

Optionally, the bidirectional transmission circuit further includes a signal protection module. The signal protection module is arranged in series between the second signal coupling module and the control module and the signal protection module is configured to perform electrostatic protection and surge protection on the bidirectional transmission circuit.

DETAILED DESCRIPTION

The solutions of the present application are described fully hereinafter through specific embodiments in conjunction with the drawings in embodiments of the present application.

Figure 1:
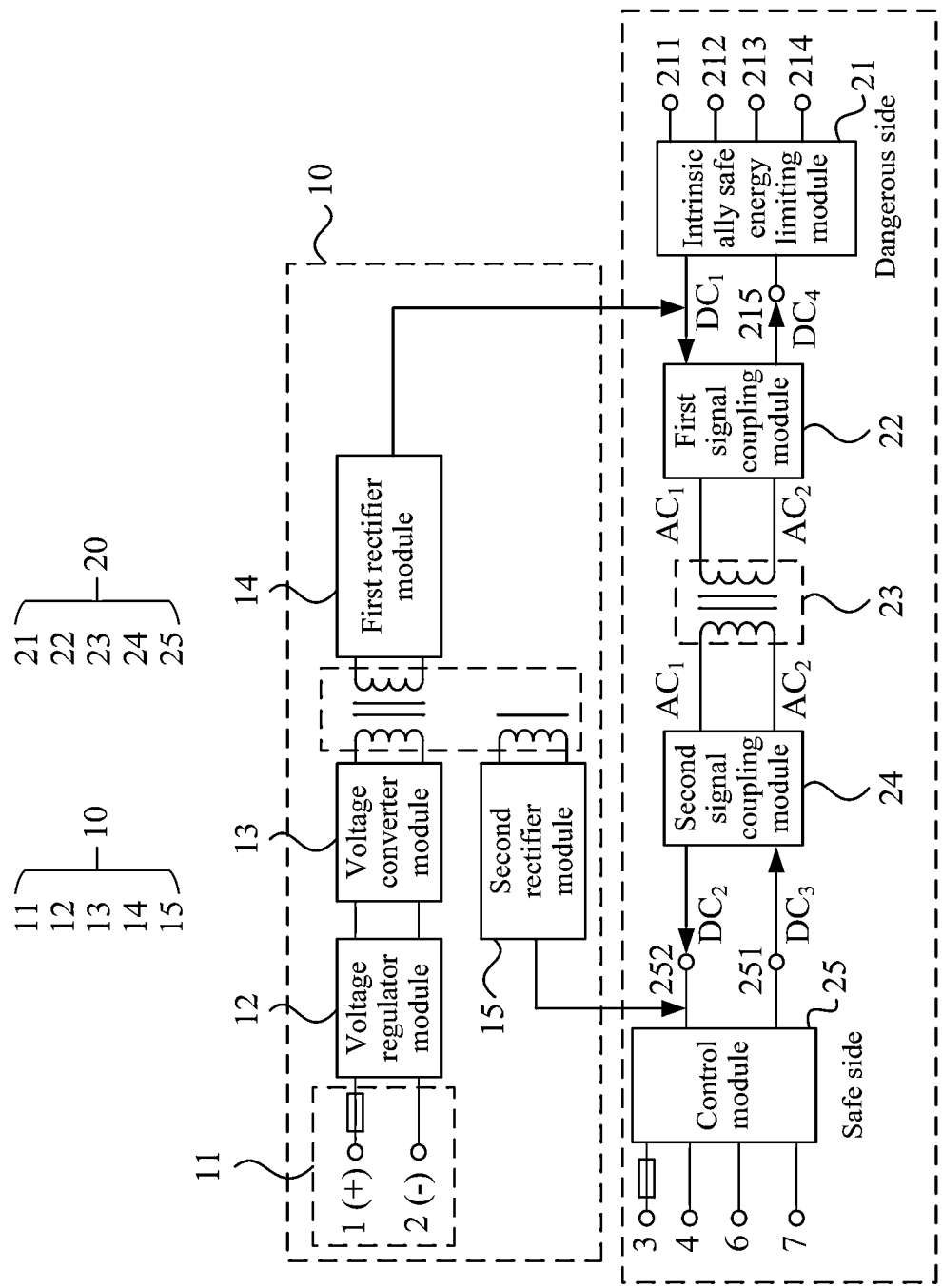
FIG. 1 is a block diagram of a bidirectional transmission circuit for a universal signal according to an embodiment of the present application.

Embodiments of the present application provide a bidirectional transmission circuit for a universal signal for bidirectional transmission of various universal signals between field devices and a PLC/DC S in an industrial control system. FIG. 1 is a block diagram of a bidirectional transmission circuit for a universal signal according to an embodiment of the present application. As shown in FIG. 1, the bidirectional transmission circuit for a universal signal includes a power supply module 10 and a bidirectional transmission module 20. The bidirectional transmission module 20 includes an intrinsically safe energy limiting module 21, a first signal coupling module 22, an isolation transformer module 23, a second signal coupling module 24 and a control module 25. The first signal coupling module 22 is electrically connected to the intrinsically safe energy limiting module 21 and the isolation transformer module 23, and the second signal coupling module 24 is electrically connected to the isolation transformer module 23 and the control module 25. The power supply module 10 is electrically connected to the intrinsically safe energy limiting module 21, the first signal coupling module 22, the second signal coupling module 24 and the control module 25.

The intrinsically safe energy limiting module 21 includes a control signal receiving terminal 215 and at least one universal signal input terminal (such as input terminals 211, 212, 213 and 214 shown in FIG. 1). The control signal receiving terminal 215 is configured to receive a control signal, and each universal signal input terminal is configured to input a universal signal. The control module 25 includes a control signal output terminal 251 and a universal signal receiving terminal 252. The control signal output terminal 251 is configured to output the control signal, and the universal signal receiving terminal 252 is configured to receive the universal signal. The first signal coupling module 22 is configured to adjust a first direct current signal $DC_1$ of the universal signal to be a first alternating current signal $AC_1$, the isolation transformer module 23 is configured to transmit the first alternating current signal $AC_1$ to the second signal coupling module 24 in an isolation manner, and the second signal coupling module 24 is configured to adjust the first alternating current signal $AC_1$ to be a second direct current signal $DC_2$ and transmit the second direct current signal $DC_2$ to the universal signal receiving terminal. The second signal coupling module 24 is further configured to adjust a third direct current signal $DC_3$ of the control signal to be a second alternating current signal $AC_2$, the isolation transformer module 23 is further configured to transmit the second alternating current signal $AC_2$ to the first signal coupling module 22 in an isolation manner, and the first signal coupling module 22 is further configured to adjust the second alternating current signal $AC_2$ to be a fourth direct current signal $DC_4$ and transmit the fourth direct current signal $DC_4$ to the control signal receiving terminal.

For example, as shown in FIG. 1, the bidirectional transmission circuit for a universal signal includes a power supply module 10 and a bidirectional transmission module 20, where the power supply module 10 is configured to provide an alternating current power supply or a direct current power supply for the intrinsically safe energy limiting module 21, the first signal coupling module 22, the second signal coupling module 24 and the control module 25 in the bidirectional transmission module 20.

The intrinsically safe energy limiting module 21 includes a control signal receiving terminal 215 and at least one universal signal input terminal (such as input terminals 211, 212, 213 and 214 shown in FIG. 1), and one universal signal input terminal may receive one universal signal. In an industrial control system, the universal signal includes a pressure signal from a pressure sensor, a temperature signal from a temperature sensor, a position signal from a positioning valve, a position signal from a solenoid valve, or an on-off signal from a proximity switch and the like. When the universal signal input terminal of the intrinsically safe energy limiting module 21 of the bidirectional transmission circuit receives a universal signal having a high voltage or a universal signal having a high current from a signal detection terminal, the intrinsically safe energy limiting module 21 first performs voltage limiting processing on the received universal signal having a high voltage or performs current limiting processing on the received universal signal having a high current so that the universal signal having a high voltage or the universal signal having a high current conforms to the intrinsic safety authentication, and then transmits the universal signal conforming to the intrinsic safety authentication to the first signal coupling module 22. The first signal coupling module 22 adjusts a first direct current signal $DC_1$ of the universal signal to be a first alternating current signal $AC_1$ and couples the first alternating current signal $AC_1$ to the isolation transformer module 23, and the isolation transformer module 23 transmits the first alternating current signal $AC_1$ to the second signal coupling module 24 in an isolation manner. The second signal coupling module 24 adjusts the first alternating current signal $AC_1$ to be a second direct current signal $DC_2$ and transmits the second direct current signal $DC_2$ to the universal signal receiving terminal of the control module 25, achieving the signal transmission of the universal signal from the intrinsically safe energy limiting module 21 on a dangerous side to the control module 25 on a safe side. The isolation transformer module 23 includes an isolation transformer. In universal signal bidirectional transmission, the isolation transformer isolates the input and the output from each other, thereby improving the anti-interference capability of signal transmission, avoiding excessive voltages or currents, and protecting the board of DCS or PLC. The control module 25 includes an upper computer, a PLC/DCS and the like and is configured to receive a universal signal and send a corresponding control signal according to the universal signal. The control signal includes opening or closing a solenoid valve, opening or closing a proximity switch, and the like.

For example, when the dangerous side of the bidirectional transmission circuit is connected to a pressure sensor which is configured to monitor the pressure of a to-be-detected device in real time, such as the gas pressure in a gas tank, if the pressure signal from the pressure sensor received by the control module 25 is lower than a preset danger threshold, the control module 25 continuously receives the pressure signal transmitted from the intrinsically safe energy limiting module 21, and if the received pressure signal from the pressure sensor is higher than the preset danger threshold or lower than a minimum danger value, the control module 25 outputs a control signal which controls the solenoid valve at the gas outlet of the gas tank to be turned on or turned off. When the control module 25 outputs the control signal through the control signal output terminal 251, the second signal coupling module 24 adjusts the third direct current signal $DC_3$ of the control signal to be a second alternating current signal $AC_2$ and couples the second alternating current signal $AC_2$ to the isolation transformer module 23, the isolation transformer module 23 transmits the second alternating current signal $AC_2$ to the first signal coupling module 22 in an isolation manner, and the first signal coupling module 22 adjusts the second alternating current signal $AC_2$ to be a fourth direct current signal $DC_4$ and transmits the fourth direct current signal $DC_4$ to the control signal receiving terminal 215 of the intrinsically safe limiting module 21, thereby achieving signal transmission of the control signal from the control module 25 on the safe side to the intrinsically safe limiting module 21 on the dangerous side. The signal output terminal of the intrinsically safe limiting module 21 transmits the control signal having the fourth direct current signal $DC_4$ to a rotating motor of the solenoid valve at the gas outlet of the gas tank, and the solenoid valve may be opened or closed under the drive of the rotating motor, so that avoiding the gas leakage or the excessive pressure of the gas tank.

In summary, the bidirectional transmission circuit for a universal signal provided by the embodiments of the present application includes a power supply module and a bidirectional transmission module. The bidirectional transmission module includes an intrinsically safe energy limiting module, a first signal coupling module, an isolation transformer module, a second signal coupling module and a control module. The intrinsically safe energy limiting module includes a control signal receiving terminal and at least one universal signal input terminal. When the intrinsically safe energy limiting module receives one or more universal signals transmitted from the signal detection terminal and transmits the universal signal which conforms to the intrinsic safety authentication to the first signal coupling module, the first signal coupling module is configured to adjust a first direct current signal of the universal signal to be a first alternating current signal, the isolation transformer module is configured to transmit the first alternating current signal to the second signal coupling module in an isolation manner, and the second signal coupling module is configured to adjust the first alternating current signal to be a second direct current signal and transmit the second direct current signal to the universal signal receiving terminal of the control module, achieving transmission of the control signal of a detection side to a control side. When the control signal transmitted from the control side is transmitted to the second signal coupling module, the second signal coupling module adjusts a third direct current signal of the control signal to be a second alternating current signal, and the first signal coupling module is further configured to adjust the second alternating current signal to be a fourth direct current signal and transmit the fourth direct current signal to the control signal receiving terminal of the intrinsically safe energy limiting module, achieving transmission of the universal signal from the control side to the detection side. With the bidirectional transmission circuit for a universal signal provided by this embodiment, the anti-interference performance of the universal signal can be enhanced, the anti-interference capability of the signal transmission can be improved, and the bidirectional transmission of the universal signal in a circuit can be achieved, thereby effectively reducing the production cost and improving the applicability of the control system.

Figure 2:
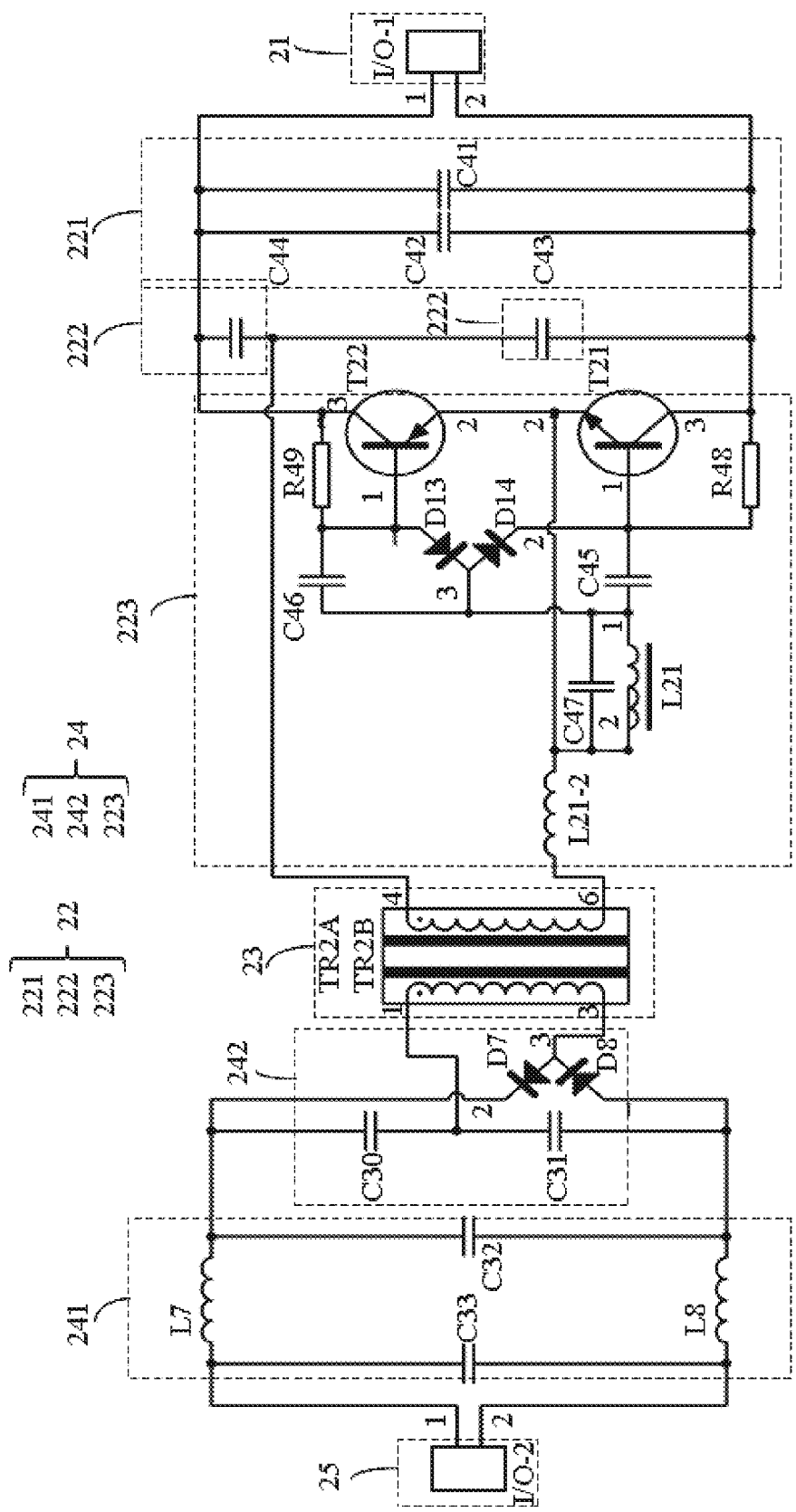
FIG. 2 is a structure diagram of the circuit of a bidirectional transmission module according to an embodiment of the present application.

On the basis of the above embodiment, FIG. 2 is a structure diagram of the circuit of a bidirectional transmission module according to an embodiment of the present application. As shown in FIG. 2, optionally, the first signal coupling module 22 includes a first filtering unit 221, a first alternating current-direct current conversion unit 222 and a direct current-alternating current conversion unit 223. The second signal coupling module 24 includes a second filtering unit 241, a second alternating current-direct current conversion unit 242 and the direct current-alternating current conversion unit 223. The first filtering unit 221 and the second filtering unit 241 are each configured to filter the universal signal and the control signal. The first alternating current-direct current conversion unit 222 is configured to adjust the second alternating current signal $AC_2$ to be a fourth direct current signal $DC_4$ and transmit the fourth direct current signal $DC_4$ to the control signal receiving terminal. The second alternating current-direct current conversion unit 242 is configured to adjust the first alternating current signal $AC_1$ to be a second direct current signal $DC_2$ and transmit the second direct current signal $DC_2$ to the universal signal receiving terminal. The direct current-alternating current conversion unit 223 is configured to adjust the first direct current signal $DC_1$ of the universal signal to be a first alternating current signal $AC_1$ and adjust the third direct current signal $DC_3$ of the control signal to be a second alternating current signal $AC_2$.

With continued reference to FIGS. 1 and 2, optionally, the first filtering unit 221 includes a first capacitor (C41) and a second capacitor (C42). The first terminal of the first capacitor (C41) is electrically connected to each universal signal input terminal (such as the pin 1 of the I/O-1 shown in FIG. 2), and the second terminal of the first capacitor (C41) is electrically connected to the control signal receiving terminal (such as the pin 2 of the I/O-1 shown in FIG. 2). The first terminal of the second capacitor (C42) is electrically connected to each universal signal input terminal, and the second terminal of the second capacitor (C42) is electrically connected to the control signal receiving terminal.

The first alternating current-direct current conversion unit 222 includes a third capacitor (C44) and a fourth capacitor (C43). The direct current-alternating current conversion unit 223 includes a first inductor (L21-2), a second inductor (L21), a fifth capacitor (C47), a first diode (D13), a second diode (D14), a first transistor (T22) and a second transistor (T21). The first terminal of the third capacitor (C44) is electrically connected to each universal signal input terminal, the first terminal 3 of the first transistor (T22), the control terminal 1 of the first transistor (T22) and the anode 1 of the first diode (D13), and the second terminal of the third capacitor (C44) is electrically connected to the first terminal of the fourth capacitor (C43) and the first terminal 4 of the isolation transformer module 23. The second terminal of the fourth capacitor (C43) is electrically connected to the control signal receiving terminal, the first terminal 3 of the second transistor (T21), the control terminal 1 of the second transistor (T21), the cathode 2 of the second diode (D14), the first terminal 1 of the second inductor (L21) and the first terminal of the fifth capacitor (C47). The first terminal of the first inductor (L21-2) is electrically connected to the second terminal 6 of the isolation transformer module 23, and the second terminal of the first inductor (L21-2) is electrically connected to the second terminal of the second inductor (L21), the second terminal of the fifth capacitor (C47), the second terminal 2 of the first transistor (T22) and the second terminal 2 of the second transistor (T21). The cathode 3 of the first diode (D13) is electrically connected to the anode 3 of the second diode (D14).

The second filtering unit 241 includes a third inductor (L7), a fourth inductor (L8), a sixth capacitor (C33) and a seventh capacitor (C32). The first terminal of the third inductor (L7) is electrically connected to the universal signal receiving terminal (such as the pin 1 of the I/O-2 shown in FIG. 2) and the first terminal of the sixth capacitor (C33), and the second terminal of the third inductor (L7) is electrically connected to the first terminal of the seventh capacitor (C32). The first terminal of the fourth inductor (L8) is electrically connected to the control signal output terminal (such as the pin 2 of the I/O-2 shown in FIG. 2) and the second terminal of the sixth capacitor (C33), and the second terminal of the fourth inductor (L8) is electrically connected to the second terminal of the seventh capacitor (C32).

The second alternating current-direct current conversion unit 242 includes an eighth capacitor (C30), a ninth capacitor (C31), a third diode (D7) and a fourth diode (D8). The first terminal of the eighth capacitor (C30) is electrically connected to the second terminal of the third inductor (L7) and the cathode 2 of the third diode (D7), and the second terminal of the eighth capacitor (C30) is electrically connected to the first terminal of the ninth capacitor (C31) and the third terminal 1 of the isolation transformer module 23. The second terminal of the ninth capacitor (C31) is electrically connected to the second terminal of the fourth inductor (L8) and the anode 1 of the fourth diode (D8). The anode 3 of the third diode (D7) and the cathode 3 of the fourth diode (D8) are each electrically connected to the fourth terminal 3 of the isolation transformer module 23.

For example, with continued reference to FIGS. 1 and 2, the bidirectional transmission of the universal signal in a circuit can achieve the function of connecting an analog input (AI) (i.e. the intrinsically safe transmitter) in the bidirectional transmission circuit or the function of connecting an analog output (AO) (i.e. the intrinsically safe positioning valve) in the bidirectional transmission circuit, can also achieve the function of connecting the digital input (DI) (i.e. the intrinsically safe proximity switch input and the relay output), and can also achieve the function of connecting digital output (DO) (i.e. the switch input and the current source output to drive a field intrinsically safe solenoid valve).

For example, as shown in FIG. 1, the universal signal input terminals 211 and 214 of the intrinsically safe energy limiting module 21 are connected to the universal signal output terminal of the intrinsically safe transmitter, the universal signal generated by the intrinsically safe transmitter may be transmitted from the intrinsically safe energy limiting module 21 on the dangerous side to the control module 25 on the safe side, and the control module 25 may transmit the control signal for the intrinsically safe transmitter from the safe side to the control signal receiving terminal of the intrinsically safe energy limiting module 21 on the dangerous side. As shown in FIG. 2, the direct current-alternating current conversion unit 223 functions as a common unit of the first signal coupling module 22 and the second signal coupling module 24. In the circuit of the bidirectional transmission module, the direct current-alternating current conversion unit 223 cooperates with the isolation transformer module 23 to achieve the bidirectional transmission of the universal signal.

The direct current-alternating current conversion unit 223 includes a first inductor (L21-2), a second inductor (L21), a fifth capacitor (C47), a first diode (D13), a second diode (D14), a first transistor (T22) and a second transistor (T21). As shown in FIG. 2, the first inductor (L21-2), the second inductor (L21) and the fifth capacitor (C47) constitute an LLC oscillation network circuit. When both the first terminal 1 and the second terminal 2 of the second inductor (L21) are supplied with high and low power supply voltages by the power supply module 10, the LLC oscillation network circuit oscillates, alternately turns on the first transistor (T22) or the second transistor (T21) and alternately turns off the first transistor (T22) or the second transistor (T21). When the universal signal input terminals 211 and 214 in the circuit receive universal signals, the LLC oscillation network circuit adjusts a first direct current signal $DC_1$ of the universal signal to be a first alternating current signal $AC_1$. And the first alternating current signal AC is coupled into the first terminal 4 and the second terminal 6 of the isolation transformer module 23 and is output via the third terminal 1 and the fourth terminal 3 of the isolation transformer module 23, and the second alternating current-direct current conversion unit 242 adjusts the first alternating current signal $AC_1$ to a second direct current signal $DC_1$. When the control signal output terminal in the circuit outputs a third direct current signal $DC_3$ of a control signal, the LLC oscillation network circuit adjusts the third direct current signal $DC_3$ of the control signal to be a second alternating current signal $AC_2$. And the second alternating current signal $AC_2$ is coupled into the third terminal 1 and the fourth terminal 3 of the isolation transformer module 23 and is output via the first terminal 4 and the second terminal 6 of the isolation transformer module 23, and the first alternating current-direct current conversion unit 222 adjusts the second alternating current signal $AC_2$ to be a fourth direct current signal $DC_4$.

The isolation transformer module 23 may employ an isolation transformer with an isolation voltage conversion ratio of 1:1. On the basis of the isolated variable voltage transmission characteristics of the isolation transformer, the third terminal 1 and the fourth terminal 3 of the isolation transformer 23 satisfy the characteristic of alternately outputting high and low levels. When the third terminal 1 of the isolation transformer 23 is at a high level and the fourth terminal 3 is at a low level, the first alternating current signal $AC_1$ flows from the third terminal 1 with the high level of the isolation transformer 23 through the second terminal of the eighth capacitor (C30), the third inductor (L7), the sixth capacitor (C33), the seventh capacitor (C32), the fourth inductor (L8), the anode 1 of the fourth diode (D8) and back to the fourth terminal 3 with the low level of the isolation transformer 23 to complete a first cycle of alternating current-to-direct current filtering. When the third terminal 1 of the isolation transformer module 23 is at a low level and the fourth terminal 3 is at a high level, the first alternating current signal $AC_1$ flows from the fourth terminal 3 with the high level of the isolation transformer module 23 through the anode 3 of the third diode (D7), the third inductor (L7), the sixth capacitor (C33), the seventh capacitor (C32), the fourth inductor (L8), the second terminal of the ninth capacitor (C31) and back to the third terminal 1 with the low level of the isolation transformer module 23 to complete a second cycle of alternating current-to-direct current filtering. The first alternating current signal $AC_1$ is filtered in the first cycle and the second cycle of alternating current-to-direct current filtering to form a stably output second direct current signal $DC_2$. The second direct current signal $DC_2$ enters the universal signal receiving terminal (such as the pin 1 of the I/O-2 shown in FIG. 2) of the control module 25 to complete the transmission of the universal signal generated by the intrinsically safe transmitter from the intrinsically safe limiting module 21 on the dangerous side to the control module 25 on the safe side.

The eighth capacitor (C30) and the ninth capacitor (C31) have a filtering function of converting an alternating current signal into a direct current signal, the it-type filter circuit including the third inductor (L7), the sixth capacitor (C33), the seventh capacitor (C32) and the fourth inductor (L8) has the functions of energy storage and filtering, and the third diode (D7) and the fourth diode (D8) are single-way conducting diodes and satisfy the single-way conduction requirement of the circuit.

With continued reference to FIGS. 1 and 2, when the universal signal received by the control module 25 satisfies the criteria of the safety signal, the intrinsically safe limiting module 21 continuously transmits the universal signal to the control module 25, and when the control module 25 monitors that the universal signal sent by the device on the dangerous side exceeds a warning value, the control module 25 sends a control signal through the control signal output terminal (such as the pin 2 of the I/O-2 shown in FIG. 2). Due to the joint action of the LLC oscillation network circuit and the isolation transformer module 23, the third direct current signal $DC_3$ of the control signal is adjusted to be a second alternating current signal $AC_2$, and the second alternating current signal $AC_2$ is output through the first terminal 4 and the second terminal 6 of the isolation transformer module 23.

When the first terminal 4 of the isolation transformer 23 is at a high level and the second terminal 6 is at a low level, the first transistor (T22) is turned off, the second transistor (T21) is turned on, and the second alternating current signal $AC_2$ output from the first terminal 4 at the high level of the isolation transformer 23 flows from the second terminal of the third capacitor (C44) of the first alternating current-direct current conversion unit 222 through the first capacitor (C41), the second capacitor (C42) of the first filtering unit 221, the first terminal 3 of the second transistor (T21), the second terminal 2 of the second transistor (T21) the first inductor (L21-2) and back to the second terminal 6 with the low level of the isolation transformer 23 to complete a first cycle of alternating current-to-direct current filtering. When the first terminal 4 of the isolation transformer 23 is at a low level and the second terminal 6 is at a high level, the first transistor (T22) is turned on, the second transistor (T21) is turned off, and the second alternating current signal $AC_2$ output from the second terminal 6 with the high level of the isolation transformer 23 flows from the first terminal of the first inductor (L21-2) through the second terminal 2 of the first transistor (T22), the first terminal 3 of the first transistor (T22), the first capacitor (C41) and the second capacitor (C42) of the first filtering unit 221, the fourth capacitor (C43) and back to the first terminal 4 with the low level of the isolation transformer 23 to complete a second cycle of alternating current-to-direct current filtering. The second alternating current signal $AC_2$ is filtered in the first cycle and the second cycle of alternating current-to-direct current filtering to form a stably output fourth direct current signal $DC_4$. The fourth direct current signal $DC_4$ enters the control signal receiving terminal (such as the pin 2 of the I/O-1 shown in FIG. 2) of the intrinsically safe limiting module 21 to complete the transmission of the control signal output by the control module 25 for the intrinsically safe transmitter from the safe side to the control signal receiving terminal of the intrinsically safe limiting module 21 on the dangerous side.

The third capacitor (C44) and the fourth capacitor (C43) have a filtering function of converting an alternating current signal into a direct current signal, and the it-type filter circuit including the first inductor (C41) and the second capacitor (C42) has the functions of energy storage and filtering.

On the basis of the above embodiments, with continued reference to FIG. 2, the direct current-alternating current conversion unit 223 further includes a first resistor (R49), a second resistor (R48), a tenth capacitor (C46) and an eleventh capacitor (C45). The first resistor (R49) is arranged in series between the control terminal 1 of the first transistor (T22) and the first terminal 3 of the first transistor (T22). The second resistor (R48) is arranged in series between the control terminal 1 of the second transistor (T21) and the first terminal 3 of the second transistor (T21). The first terminal of the tenth capacitor (C46) is electrically connected to the first terminal of the first resistor (R49), and the second terminal of the tenth capacitor (C46) is electrically connected to the cathode 3 of the first diode (D13) and the anode 3 of the second diode (D14). The eleventh capacitor (C45) is arranged in series between the first terminal 1 of the second inductor (L21) and the control terminal 1 of the second transistor (T21).

For example, the bidirectional transmission circuit for a universal signal is provided with specific resistor elements and capacitor elements to achieve normal signal transmissions without interference. For example, the first resistor (R49), the second resistor (R48), the tenth capacitor (C46) and the eleventh capacitor (C45) are provided to balance the stability of the circuit of the direct current-alternating current conversion unit 223. The first resistor (R49) may be a flooding resistor with a large resistance to avoid the first transistor (T22) being turned-on and turned-off at a high frequency under high voltages and causing damage to the device. The tenth capacitor (C46) and the eleventh capacitor (C45) are used as blocking capacitors for alternately turning on the second transistor (T21) and the first transistor (T22) to convert a direct current signal into an alternating current signal, and operate in an oscillation manner in the LLC oscillation network circuit.

Figure 3:
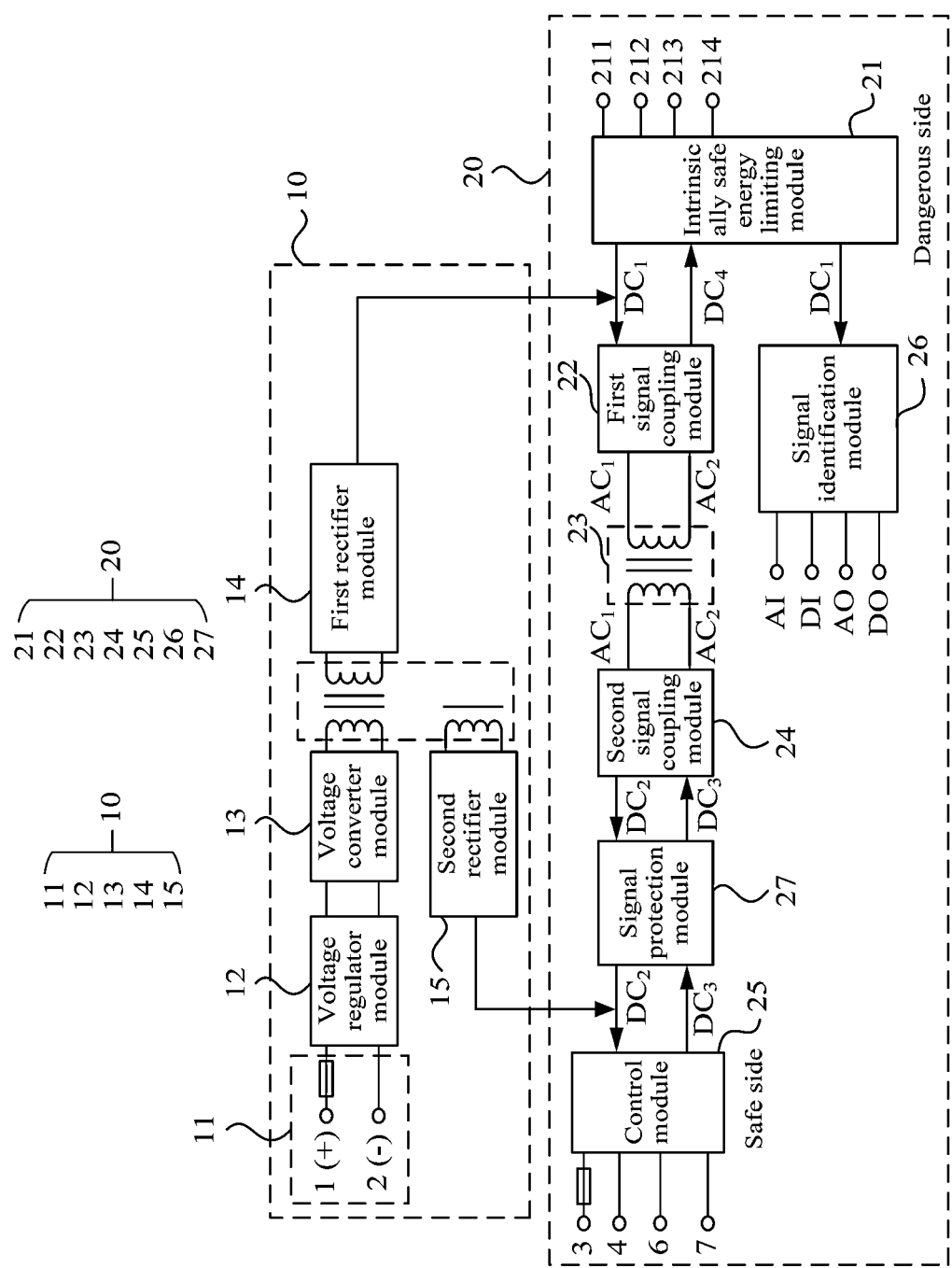
FIG. 3 is a block diagram of another bidirectional transmission circuit for a universal signal according to an embodiment of the present application.
Figure 4:
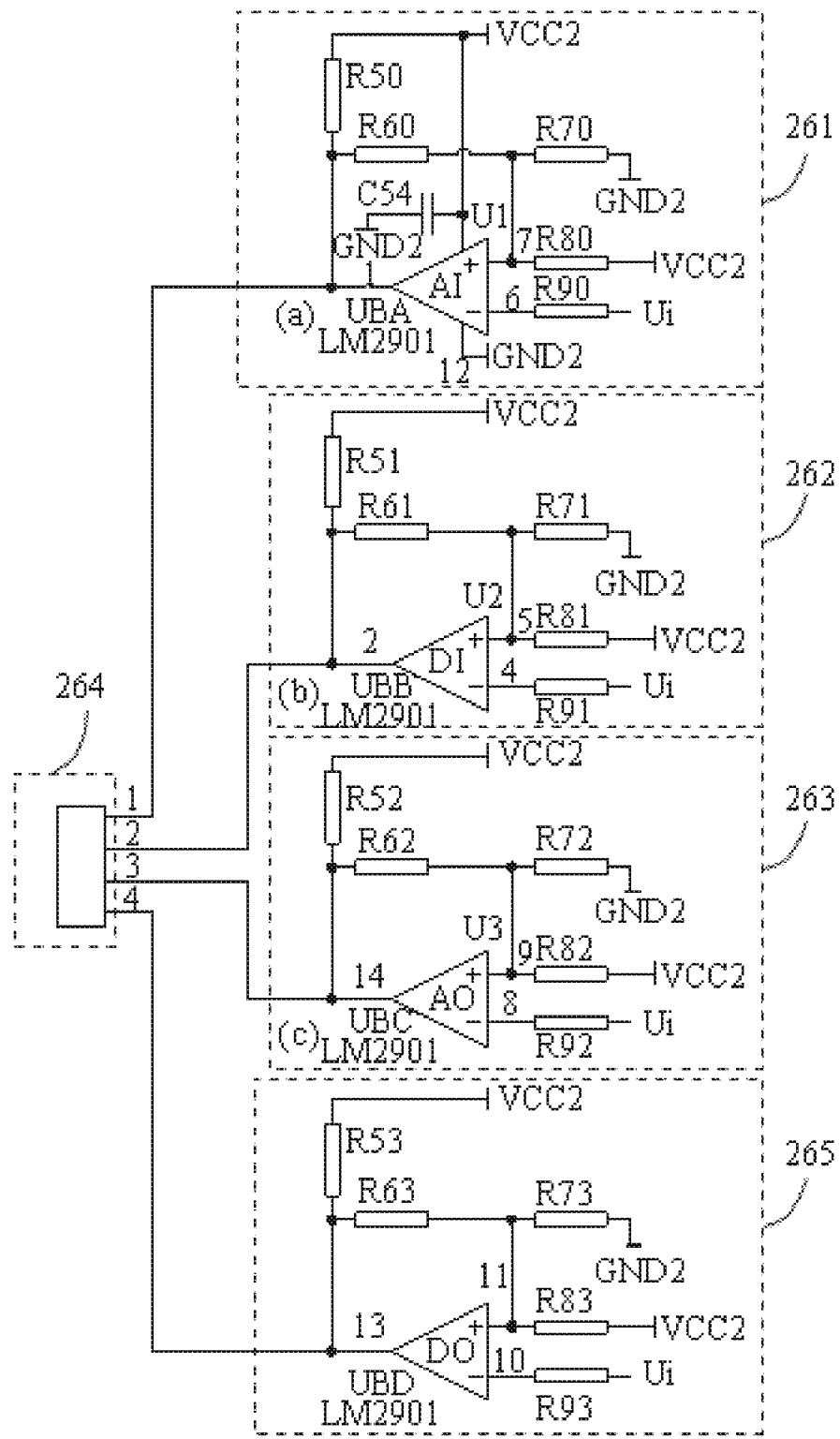
FIG. 4 is a structure diagram of the circuit of a signal identification module according to an embodiment of the present application.

As a possible embodiment, FIG. 3 is a block diagram of another bidirectional transmission circuit for a universal signal according to an embodiment of the present application, and FIG. 4 is a structure diagram of the circuit of a signal identification module according to an embodiment of the present application. As shown in FIG. 3, the bidirectional transmission circuit 20 further includes a signal identification module 26. The signal identification module 26 is arranged in parallel with the first signal coupling module 22. The signal identification module 26 includes at least two comparison units. The negative phase input terminal of each of the at least two comparison units is electrically connected to the output terminal of the intrinsically safe energy limiting module 21, and the reference signals input to positive phase input terminals of any two comparison units are different.

For example, the bidirectional transmission circuit 20 further includes a signal identification module 26. The signal identification module 26 is configured to determine the type of the universal signal. The signal identification module 26 is arranged in parallel with the first signal coupling module 22. The signal identification module 26 is set to include at least two comparison units, and each comparison unit includes a comparator. The signal identification module 26 determines the type of the universal signal by comparing the first direct current signal $DC_1$ of the universal signal output by the intrinsically safe energy limiting module 21 with multiple reference signals. The signal identification module 26 may be connected to a display device or an information prompting device for displaying or prompting the type of the universal signal to facilitate the operation of operators.

Optionally, as shown in FIGS. 3 and 4, the universal signal includes an intrinsically safe analog input signal AI, an intrinsically safe analog output signal AO, an intrinsically safe digital input signal DI and an intrinsically safe digital output signal DO. The at least two comparison units include a first comparison unit 261, a second comparison unit 262, a third comparison unit 263 and a signal decoding unit 264. The first comparison unit 261 includes a first negative phase input terminal (−) and a first positive phase input terminal (+), and the first comparison unit 261 is configured to compare the universal signal with a first reference signal $U_1$ to obtain a first comparison signal (a) and transmit the first comparison signal (a) to the signal decoding unit 264. The second comparison unit 262 includes a second negative phase input terminal (−) and a second positive phase input terminal (+), and the second comparison unit 262 is configured to compare the universal signal with a second reference signal $U_2$ to obtain a second comparison signal (b) and transmit the second comparison signal (b) to the signal decoding unit 264. The third comparison unit 263 includes a third negative phase input terminal (−) and a third positive phase input terminal (+), and the third comparison unit 263 is configured to compare the universal signal with a third reference signal $U_3$ to obtain a third comparison signal (c) and transmit the third comparison signal (c) to the signal decoding unit 264. The signal decoding unit 264 is configured to determine the type of the universal signal according to the first comparison signal (a), the second comparison signal (b) and the third comparison signal (c). The first reference signal $U_1$, the second reference signal $U_2$ and the third reference signal $U_3$ are successively decreased.

For example, the universal signal includes an intrinsically safe analog input signal AI, an intrinsically safe analog output signal AO, an intrinsically safe digital input signal DI and an intrinsically safe digital output signal DO. The signal identification module 26 is connected in parallel to the first signal coupling module 22, and any of the universal signals of AI, AO, DI and DO is compared by a comparison unit of the signal identification module 26 to determine the signal type of the compared signal. For example, the first reference signal $U_1$, the second reference signal $U_2$ and the third reference signal $U_3$ are set to be successively decreased, and the voltage value of the first direct current signal $DC_1$ of the universal signal is compared with the first reference signal $U_1$, the second reference signal $U_2$ and the third reference signal $U_3$ respectively to determine the signal type of the first direct current signal $DC_1$ of the universal signals AI, AO, DI and DO.

The first comparison unit 261 includes an AI comparator. The first direct current signal $DC_1$ of the universal signal inputs into the first negative phase input terminal (−) of the first comparison unit 261, the first reference signal $U_1$ inputs into the first positive phase input terminal (+), and the first direct current signal $DC_1$ is compared with the first reference signal $U_1$ to obtain a first comparison signal (a). If the voltage value of the first direct current signal $DC_1$ is higher than the voltage value of the first reference signal $U_1$, the first comparison signal (a) is 1, and if the voltage value of the first direct current signal $DC_1$ is not higher than the voltage value of the first reference signal $U_1$, the first comparison signal (a) is 0. The second comparison unit 262 includes a DI comparator. The first direct current signal $DC_1$ of the universal signal inputs into the second negative phase input terminal (−) of the second comparison unit 262, the second reference signal $U_2$ inputs into the second positive phase input terminal (+), and the first direct current signal $DC_1$ is compared with the second reference signal $U_2$ to obtain a second comparison signal (b). If the voltage value of the first direct current signal $DC_1$ is higher than the voltage value of the second reference signal $U_2$, the second comparison signal (b) is 1, and if the voltage value of the first direct current signal $DC_1$ is not higher than the voltage value of the second reference signal $U_2$, the second comparison signal (b) is 0. The third comparison unit 263 includes an AO comparator. The first direct current signal $DC_1$ of the universal signal inputs into the third negative phase input terminal (−) of the third comparison unit 263, the third reference signal $U_3$ inputs into the third positive phase input terminal (+), and the first direct current signal $DC_1$ is compared with the third reference signal $U_3$ to obtain a third comparison signal (c). If the voltage value of the first direct current signal $DC_1$ is higher than the voltage value of the third reference signal $U_3$, the third comparison signal (c) is 1, and if the voltage value of the first direct current signal $DC_1$ is not higher than the voltage value of the third reference signal $U_3$, the third comparison signal (c) is 0. For example, the ratio of the first reference signal $U_1$, the second reference signal $U_2$ and the third reference signal $U_3$ may be set as 3:2:1.

When the first comparison signal (a) received by the decoding unit 264 is 1, the universal signal is directly determined to be an AI signal, and when the first comparison signal (a) received by the decoding unit 264 is 0, the second comparison signal (b) is continued to be read. When the second comparison signal (b) received by the decoding unit 264 is 1, the universal signal is directly determined to be a DI signal, and when the second comparison signal (b) received by the decoding unit 264 is 0, the third comparison signal (c) is continued to be read. When the third comparison signal (c) received by the decoding unit 264 is 1, the universal signal is directly determined to be an AO signal, and when the third comparison signal (c) received by the decoding unit 264 is 0, the universal signal is directly determined to be a DO signal. The type of the universal signal in the bidirectional transmission is determined by signal-by-signal comparison, thereby enhancing the anti-interference characteristic of the bidirectional transmission circuit without affecting the signal transmission.

Optionally, with continued reference to FIGS. 1 and 4, the first comparison unit 261 includes a first comparator AI, a first comparison resistor (R80) and a second comparison resistor (R70). The first terminal of the first comparison resistor (R80) is electrically connected to a first voltage signal VCC2 input terminal, the first terminal of the second comparison resistor (R70) is connected to ground GND2, the second terminal of the first comparison resistor (R80), the second terminal of the second comparison resistor (R70) and the positive phase input terminal (+) of the first comparator AI are electrically connected, the negative phase input terminal (−) of the first comparator AI is electrically connected to the output terminal of the intrinsically safe energy limiting module 21, and the output terminal of the first comparator AI is electrically connected to the signal decoding unit 264. The second comparison unit 262 includes a second comparator DI, a third comparison resistor (R81) and a fourth comparison resistor (R71). The first terminal of the third comparison resistor (R81) is electrically connected to a first voltage signal VCC2 input terminal, the first terminal of the fourth comparison resistor (R71) is connected to ground GND2, the second terminal of the third comparison resistor (R81), the second terminal of the fourth comparison resistor (R71) and the positive phase input terminal (+) of the second comparator DI are electrically connected, the negative phase input terminal (−) of the second comparator DI is electrically connected to the output terminal of the intrinsically safe energy limiting module 21, and the output terminal of the second comparator DI is electrically connected to the signal decoding unit 264. The third comparison unit 263 includes a third comparator AO, a fifth comparison resistor (R82) and a sixth comparison resistor (R72). The first terminal of the fifth comparison resistor (R82) is electrically connected to the first voltage signal VCC2 input terminal, the first terminal of the sixth comparison resistor (R72) is connected to ground GND2, the second terminal of the fifth comparison resistor (R82), the second terminal of the sixth comparison resistor (R72) and the positive phase input terminal (+) of the third comparator AO are electrically connected, the negative phase input terminal (−) of the third comparator AO is electrically connected to the output terminal of the intrinsically safe energy limiting module 21, and the output terminal of the third comparator AO is electrically connected to the signal decoding unit 264. The first voltage signal VCC2 input terminal is electrically connected to the power supply module 10.

For example, the first voltage signal VCC2 input terminal is electrically connected to the power supply module 10 and is configured to provide a reference voltage for stable operation of the comparator. In the comparison circuit of the first comparison unit 261, the first terminal of the first comparison resistor (R80) is electrically connected to the first voltage signal VCC2 input terminal, the second terminal of the first comparison resistor (R80), the second terminal of the second comparison resistor (R70) and the positive phase input terminal (+) of the first comparator AI are electrically connected, and the resistance ratio relationship between the first comparison resistor (R80) and the second comparison resistor (R70) is reasonably set, achieving the adjustment of the value of the first reference signal $U_1$ of the comparator. For example, if the resistance ratio of the first comparison resistor (R80) to the second comparison resistor (R70) is set to be 3:1, the first reference signal $U_1$ is $U_1$=3/4 VCC2 and is used to compare with the universal signal to determine the AI signal. In the comparison circuit of the second comparison unit 262, if the resistance ratio of the third comparison resistor (R81) to the fourth comparison resistor (R71) is set to be 1:1, the second reference signal $U_2$ is $U_2$=1/2 VCC2 and is used to compare with the universal signal to determine the DI signal. In the comparison circuit of the third comparison unit 263, if the resistance ratio of the fifth comparison resistor (R82) to the sixth comparison resistor (R72) is set to be 3:1, the third reference signal $U_3$ is $U_3$=1/4 VCC2 and is used to compare with the universal signal to determine the AO signal. It is to be understood that the signal identification module 26 may further include a fourth comparison unit 265, as shown in FIG. 4, and the details will not be described here. With the comparison circuit connected in parallel, more signals may be introduced to determine, thereby extending the applicability of the circuit.

Optionally, with continued reference to FIG. 4, the first comparison unit 261 further includes a first pull-up resistor (R50), a third resistor (R60), a fourth resistor (R90) and a twelfth capacitor (C54). The first terminal of the first pull-up resistor (R50) is electrically connected to the first voltage signal VCC2 input terminal, the second terminal of the first pull-up resistor (R50) and the first terminal of the third resistor (R60) are electrically connected to the output terminal of the first comparator AI, the second terminal of the third resistor (R60) is electrically connected to the second terminal of the second comparison resistor (R70), the first terminal of the fourth resistor (R90) is electrically connected to the negative phase input terminal of the first comparator AI, the second terminal of the fourth resistor (R90) is electrically connected to the output terminal of the intrinsically safe energy limiting module 21, the first terminal of the twelfth capacitor (C54) is electrically connected to the first bias voltage input terminal of the first comparator AI, the second terminal of the twelfth capacitor (C54) is grounded, and the second bias voltage input terminal of the first comparator AI is grounded. The second comparison unit 262 further includes a second pull-up resistor (R51), a fifth resistor (R61) and a sixth resistor (R91). The first terminal of the second pull-up resistor (R51) is electrically connected to the first voltage signal VCC2 input terminal, the second terminal of the second pull-up resistor (R51) and the first terminal of the fifth resistor (R61) are electrically connected to the output terminal of the second comparator DI, the second terminal of the fifth resistor (R61) is electrically connected to the second terminal of the fourth comparison resistor (R71), the first terminal of the sixth resistor (R91) is electrically connected to the negative phase input terminal of the second comparator DI, and the second terminal of the sixth resistor (R91) is electrically connected to the output terminal of the intrinsically safe energy limiting module 21. The third comparison unit 263 further includes a third pull-up resistor (R52), a seventh resistor (R62) and an eighth resistor (R92). The first terminal of the third pull-up resistor (R52) is electrically connected to the first voltage signal VCC2 input terminal, the second terminal of the third pull-up resistor (R52) and the first terminal of the seventh resistor (R62) are electrically connected to the output terminal of the third comparator AO, the second terminal of the seventh resistor (R62) is electrically connected to the second terminal of the sixth comparison resistor (R72), the first terminal of the eighth resistor (R92) is electrically connected to the negative phase input terminal of the third comparator AO, and the second terminal of the eighth resistor (R92) is electrically connected to the output terminal of the intrinsically safe energy limiting module 21.

For example, the comparison circuit also includes various resistor devices and capacitor devices to perform the signal comparison of the comparison unit. For example, the first pull-up resistor (R50), the third resistor (R60), the fourth resistor (R90) and the twelfth capacitor (C54) of the first comparison unit 261 are used to balance the voltage of the first voltage signal VCC2 to ensure the normal operation of the first comparator AI. The second comparison unit 262 further includes a second pull-up resistor (R51), a fifth resistor (R61) and a sixth resistor (R91). The third comparison unit 263 further includes a third pull-up resistor (R52), a seventh resistor (R62) and an eighth resistor (R92). The stability and the comparison accuracy of the comparator can be effectively improved by reasonably setting various resistance values.

Figure 5:
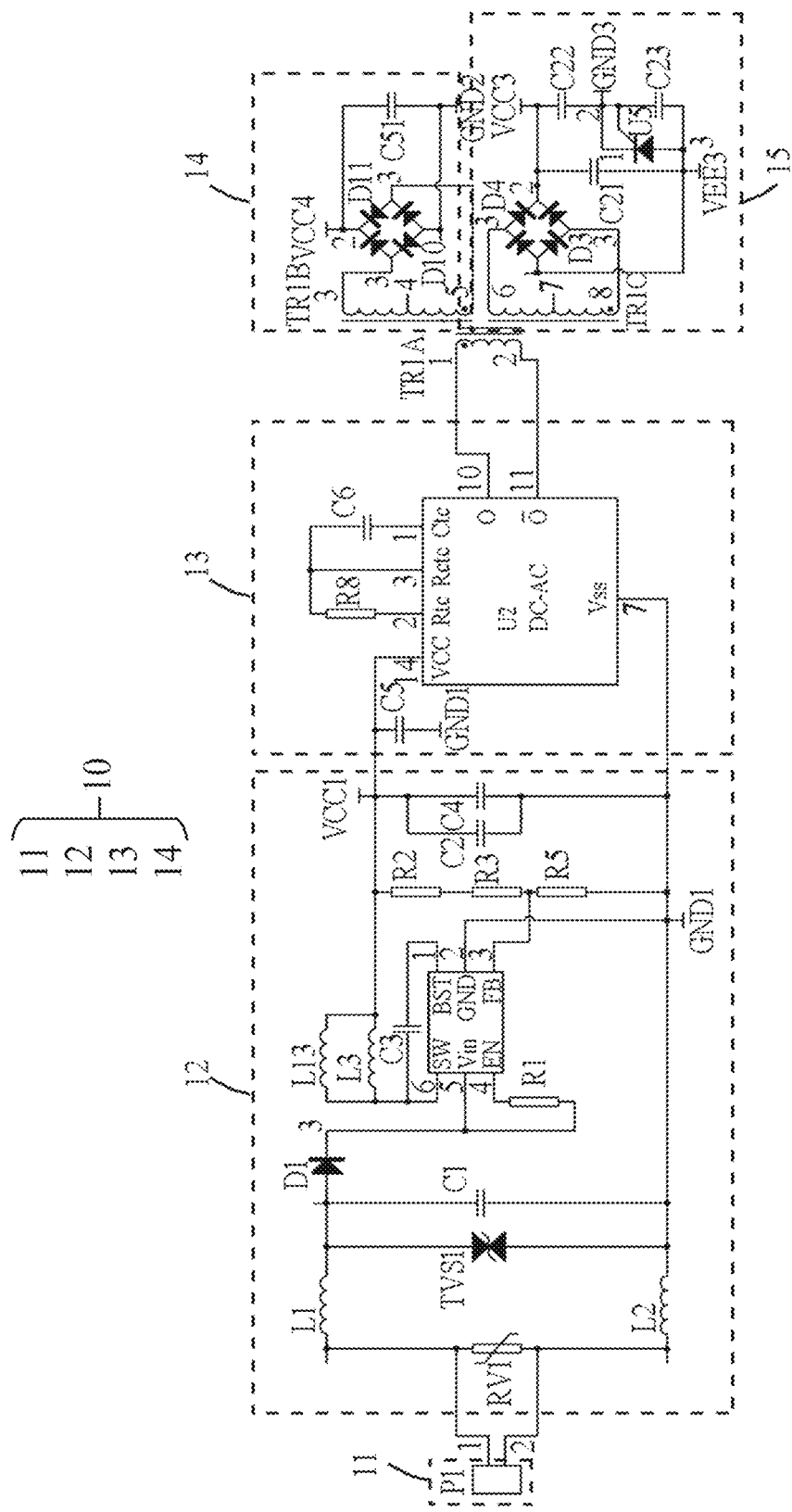
FIG. 5 is a structure diagram of the circuit of a power supply module according to an embodiment of the present application.

FIG. 5 is a structure diagram of the circuit of a power supply module according to an embodiment of the present application. As shown in FIGS. 1, 2 and 3, optionally, the power supply module 10 includes a power supply 11, a voltage regulator module 12, a voltage converter module 13, a first rectifier module 14 and a second rectifier module 15.

The power supply 11 (P1) is configured to provide a direct current power signal. The voltage regulator module 12 is configured to stably output the direct current power signal VCC1. The voltage converter module 13 is configured to convert the direct current power signal into an alternating current power signal. The first rectifier module 14 and the second rectifier module 15 are each configured to rectify the alternating current power signal into a direct current signal. The first rectifier module 14 has a first voltage VCC3, and the first rectifier module 14 is configured to provide power for the intrinsically safe energy limiting module 21 and the first signal coupling module 22. The second rectifier module 15 has a second voltage VCC4, and the second rectifier module 15 is configured to provide power to the second signal coupling module 24 and the control module 25.

For example, the bidirectional transmission circuit is an intermediate key unit between the field device and the PLC/DC S, the signal conversion isolation technology is a key technology for the bidirectional transmission circuit, and the power supply module 10 provides a stable power supply for the signal conversion isolation technology. As shown in FIGS. 1 and 5, the power supply 11 (P1) provides a direct current power supply signal. The direct current power supply signal passes through a transient voltage suppressor (TVS) TVS1 for protection, then passes through the single-way conduction diode D1 to provide power for the voltage regulator module 12 to enable the voltage regulator module 12 to generate a stably output direct current power supply signal VCC1. The direct current power supply signal VCC1 is converted into an alternating current power supply signal by the voltage converter module 13. The alternating current power supply signal is transmitted to a power supply isolation transformer and then transmitted to the first rectifier module 14 and the second rectifier module 15 in an isolation manner through the power supply isolation transformer. The first rectifier module 14 and the second rectifier module 15 are alternating current-to-direct current transformers, and the voltage division ratios of the two rectification modules are the same or different. The first rectifier module 14 and the second rectifier module 15 rectify the alternating current power supply signal to generate two paths of direct current power supply signals, and the two paths of direct current power supply signals are provided for the safe side and the dangerous side of the bidirectional transmission circuit for signal determination. For example, the first rectifier module 14 outputs the first voltage VCC3 to provide power for the intrinsically safe energy limiting module 21 and the first signal coupling module 22, and the second rectifier module 15 outputs the second voltage VCC4 to provide power for the second signal coupling module 24 and the control module 25. The voltage values of the first voltage VCC3 and the second voltage VCC4 may be the same or different by adjusting the first rectifier module 14 and the second rectifier module 15 due to the variability of the universal signal. Meanwhile, the power supply 11 (P1) may be a positive power supply or a negative power supply.

On the basis of the above embodiments, the power supply module 10 further includes a third rectification module and a fourth rectification module (not shown in FIG. 5). The third rectification module or the fourth rectification module outputs the first voltage signal VCC2, and the third rectification module or the fourth rectification module is configured to provide a comparison reference voltage for determining the type of the universal signal for the signal identification module 26. The circuit diagram of this embodiment is not described here.

Optionally, the bidirectional transmission circuit 20 further includes a signal protection module 27. The signal protection module 27 is arranged in series between the second signal coupling module 24 and the control module 25 and is configured to perform electrostatic protection and surge protection on the bidirectional transmission circuit.

For example, with continued reference to FIG. 3, the signal protection module 27 is connected in series between the second signal coupling module 24 and the control module 25 in the circuit. The signal transmission distortion and signal interference caused by the electrostatic and surge effects of the bidirectional transmission of the universal signal can be avoided by providing components such as an electrostatic isolator or a surge protector, thereby improving the accuracy of the universal signal transmission.

In summary, in the bidirectional transmission circuit for a universal signal provided by the embodiments of the present application, the transmission of the universal signal from the detection side to the control side, the transmission of the control signal from the control side to the detection side and the determination of the type of the universal signal are achieved through the unified cooperation of various modules. With the bidirectional transmission circuit for a universal signal provided by the embodiments, the anti-interference performance of the universal signal can be enhanced, the anti-interference capability of the signal transmission can be improved, and the bidirectional transmission of the universal signal in a circuit can be achieved, thereby effectively reducing the production cost and improving the applicability of the control system.

What is claimed is:

1. A bidirectional transmission circuit for a universal signal, comprising a power supply module and a bidirectional transmission module;
    wherein the bidirectional transmission module comprises an intrinsically safe energy limiting module, a first signal coupling module, an isolation transformer module, a second signal coupling module and a control module, wherein the first signal coupling module is electrically connected to the intrinsically safe energy limiting module and the isolation transformer module, respectively, and the second signal coupling module is electrically connected to the isolation transformer module and the control module, respectively, and the power supply module is electrically connected to the intrinsically safe energy limiting module, the first signal coupling module, the second signal coupling module and the control module;
    wherein the intrinsically safe energy limiting module comprises a control signal receiving terminal and at least one universal signal input terminal, the control signal receiving terminal is configured to receive a control signal, and each of the at least one universal signal input terminal is configured to input the universal signal;
    wherein the control module comprises a control signal output terminal and a universal signal receiving terminal, the control signal output terminal is configured to output the control signal, and the universal signal receiving terminal is configured to receive the universal signal;
    wherein the first signal coupling module is configured to adjust a first direct current signal of the universal signal to be a first alternating current signal, the isolation transformer module is configured to transmit the first alternating current signal to the second signal coupling module in an isolation manner, and the second signal coupling module is configured to adjust the first alternating current signal to be a second direct current signal and transmit the second direct current signal to the universal signal receiving terminal;
    wherein the second signal coupling module is further configured to adjust a third direct current signal of the control signal to be a second alternating current signal, the isolation transformer module is further configured to transmit the second alternating current signal to the first signal coupling module in an isolation manner, and the first signal coupling module is further configured to adjust the second alternating current signal to be a fourth direct current signal and transmit the fourth direct current signal to the control signal receiving terminal;
    wherein the first signal coupling module comprises a first filtering unit, a first alternating current-direct current conversion unit and a direct current-alternating current conversion unit;
    wherein the second signal coupling module comprises a second filtering unit, a second alternating current-direct current conversion unit and the direct current-alternating current conversion unit;
    wherein the first filtering unit and the second filtering unit are each configured to filter the universal signal and the control signal;
    wherein the first alternating current-direct current conversion unit is configured to adjust the second alternating current signal to be the fourth direct current signal and transmit the fourth direct current signal to the control signal receiving terminal;
    wherein the second alternating current-direct current conversion unit is configured to adjust the first alternating current signal to the second direct current signal and transmit the second direct current signal to the universal signal receiving terminal;
    wherein the direct current-alternating current conversion unit is configured to adjust the first direct current signal of the universal signal to be the first alternating current signal and adjust the third direct current signal of the control signal to be the second alternating current signal;
    wherein the first filtering unit comprises a first capacitor and a second capacitor, a first terminal of the first capacitor is electrically connected to each of the at least one universal signal input terminal, and a second terminal of the first capacitor is electrically connected to the control signal receiving terminal; a first terminal of the second capacitor is electrically connected to each of the at least one universal signal input terminal, and a second terminal of the second capacitor is electrically connected to the control signal receiving terminal;
    wherein the first alternating current-direct current conversion unit comprises a third capacitor and a fourth capacitor; the direct current-alternating current conversion unit comprises a first inductor, a second inductor, a fifth capacitor, a first diode, a second diode, a first transistor and a second transistor; a first terminal of the third capacitor is electrically connected to each of the at least one universal signal input terminal, a first terminal of the first transistor, a control terminal of the first transistor and an anode of the first diode; and a second terminal of the third capacitor is electrically connected to a first terminal of the fourth capacitor and a first terminal of the isolation transformer module; a second terminal of the fourth capacitor is electrically connected to the control signal receiving terminal, a first terminal of the second transistor, a control terminal of the second transistor, a cathode of the second diode, a first terminal of the second inductor and a first terminal of the fifth capacitor; a first terminal of the first inductor is electrically connected to a second terminal of the isolation transformer module; and a second terminal of the first inductor is electrically connected to a second terminal of the second inductor, a second terminal of the fifth capacitor, a second terminal of the first transistor and a second terminal of the second transistor; a cathode of the first diode is electrically connected to an anode of the second diode;

wherein the second filtering unit comprises a third inductor, a fourth inductor, a sixth capacitor and a seventh capacitor, wherein a first terminal of the third inductor is electrically connected to the universal signal receiving terminal and a first terminal of the sixth capacitor; and a second terminal of the third inductor is electrically connected to a first terminal of the seventh capacitor, wherein a first terminal of the fourth inductor is electrically connected to the control signal output terminal and a second terminal of the sixth capacitor, and wherein a second terminal of the fourth inductor is electrically connected to a second terminal of the seventh capacitor; and wherein the second alternating current-direct current conversion unit comprises an eighth capacitor, a ninth capacitor, a third diode and a fourth diode, wherein a first terminal of the eighth capacitor is electrically connected to the second terminal of the third inductor and a cathode of the third diode; and a second terminal of the eighth capacitor is electrically connected to a first terminal of the ninth capacitor and a third terminal of the isolation transformer module, wherein a second terminal of the ninth capacitor is electrically connected to the second terminal of the fourth inductor and an anode of the fourth diode, and wherein an anode of the third diode and a cathode of the fourth diode are each electrically connected to a fourth terminal of the isolation transformer module.

2. The bidirectional transmission circuit according to claim 1, wherein the direct current-alternating current conversion unit further comprises a first resistor, a second resistor, a tenth capacitor and an eleventh capacitor;

wherein the first resistor is arranged in series between the control terminal of the first transistor and the first terminal of the first transistor;

wherein the second resistor is arranged in series between the control terminal of the second transistor and the first terminal of the second transistor; wherein a first terminal of the tenth capacitor is electrically connected to a first terminal of the first resistor, and a second terminal of the tenth capacitor is electrically connected to the cathode of the first diode and the anode of the second diode, respectively; and wherein the eleventh capacitor is arranged in series between the first terminal of the second inductor and the control terminal of the second transistor.

3. The bidirectional transmission circuit according to claim 1, wherein the power supply module comprises a power supply, a voltage regulator module, a voltage converter module, a first rectifier module and a second rectifier module;

wherein the power supply is configured to provide a direct current power signal;

wherein the voltage regulator module is configured to stably output the direct current power signal;

wherein the voltage converter module is configured to convert the direct current power signal into an alternating current power signal;

wherein the first rectifier module and the second rectifier module are each configured to rectify the alternating current power signal into a direct current signal; the first rectifier module has a first voltage, and the first rectifier module is configured to provide power for the intrinsically safe energy limiting module and the first signal coupling module; and the second rectifier module has a second voltage, and the second rectifier module is configured to provide power for the second signal coupling module and the control module.

4. The bidirectional transmission circuit according to claim 1, further comprising a signal protection module, wherein the signal protection module is arranged in series between the second signal coupling module and the control module, and wherein the signal protection module is configured to perform electrostatic protection and surge protection on the bidirectional transmission circuit.

5. The bidirectional transmission circuit according to claim 1, further comprising a signal identification module, wherein:

the signal identification module is arranged in parallel with the first signal coupling module;

the signal identification module comprises at least two comparison units; and a negative phase input terminal of each of the at least two comparison units is electrically connected to an output terminal of the intrinsically safe energy limiting module, and reference signals input to positive phase input terminals of any two comparison units are different.

6. The bidirectional transmission circuit according to claim 5, wherein the universal signal comprises an intrinsically safe analog input signal AI, an intrinsically safe analog output signal AO, an intrinsically safe digital input signal DI and an intrinsically safe digital output signal DO;

wherein the at least two comparison units comprise a first comparison unit, a second comparison unit, a third comparison unit and a signal decoding unit;

wherein the first comparison unit comprises a first negative phase input terminal and a first positive phase input terminal, and the first comparison unit is configured to compare the universal signal with a first reference signal to obtain a first comparison signal and transmit the first comparison signal to the signal decoding unit;

wherein the second comparison unit comprises a second negative phase input terminal and a second positive phase input terminal, and the second comparison unit is configured to compare the universal signal with a second reference signal to obtain a second comparison signal and transmit the second comparison signal to the signal decoding unit;

wherein the third comparison unit comprises a third negative phase input terminal and a third positive phase input terminal, and the third comparison unit is configured to compare the universal signal with a third reference signal to obtain a third comparison signal and transmit the third comparison signal to the signal decoding unit;

wherein the signal decoding unit is configured to determine a type of the universal signal according to the first comparison signal, the second comparison signal and the third comparison signal; and wherein the first reference signal, the second reference signal and the third reference signal are successively decreased.

7. The bidirectional transmission circuit according to claim 6, wherein the first comparison unit comprises a first comparator, a first comparison resistor and a second comparison resistor; a first terminal of the first comparison resistor is electrically connected to a first voltage signal input terminal; a first terminal of the second comparison resistor is grounded; a second terminal of the first comparison resistor, a second terminal of the second comparison resistor and a positive phase input terminal of the first comparator are electrically connected; a negative phase input terminal of the first comparator is electrically connected to the output terminal of the intrinsically safe energy limiting module; and an output terminal of the first comparator is electrically connected to the signal decoding unit;

wherein the second comparison unit comprises a second comparator, a third comparison resistor and a fourth comparison resistor; a first terminal of the third comparison resistor is electrically connected to the first voltage signal input terminal; a first terminal of the fourth comparison resistor is grounded; a second terminal of the third comparison resistor, a second terminal of the fourth comparison resistor and a positive phase input terminal of the second comparator are electrically connected; a negative phase input terminal of the second comparator is electrically connected to the output terminal of the intrinsically safe energy limiting module; and an output terminal of the second comparator is electrically connected to the signal decoding unit;

wherein the third comparison unit comprises a third comparator, a fifth comparison resistor and a sixth comparison resistor; a first terminal of the fifth comparison resistor is electrically connected to the first voltage signal input terminal; a first terminal of the sixth comparison resistor is grounded; a second terminal of the fifth comparison resistor, a second terminal of the sixth comparison resistor and a positive phase input terminal of the third comparator are electrically connected; a negative phase input terminal of the third comparator is electrically connected to the output terminal of the intrinsically safe energy limiting module; and an output terminal of the third comparator is electrically connected to the signal decoding unit; and wherein the first voltage signal input terminal is electrically connected to the power supply module.

8. The bidirectional transmission circuit according to claim 7, wherein the first comparison unit further comprises a first pull-up resistor, a third resistor, a fourth resistor and a twelfth capacitor, wherein a first terminal of the first pull-up resistor is electrically connected to the first voltage signal input terminal, wherein a second terminal of the first pull-up resistor and a first terminal of the third resistor are electrically connected to the output terminal of the first comparator, wherein a second terminal of the third resistor is electrically connected to the second terminal of the second comparison resistor, wherein a first terminal of the fourth resistor is electrically connected to the negative phase input terminal of the first comparator, wherein a second terminal of the fourth resistor is electrically connected to the output terminal of the intrinsically safe energy limiting module, and wherein a first terminal of the twelfth capacitor is electrically connected to a first bias voltage input terminal of the first comparator, a second terminal of the twelfth capacitor is grounded, and a second bias voltage input terminal of the first comparator is grounded;

wherein the second comparison unit further comprises a second pull-up resistor, a fifth resistor and a sixth resistor, wherein a first terminal of the second pull-up resistor is electrically connected to the first voltage signal input terminal, wherein a second terminal of the second pull-up resistor and a first terminal of the fifth resistor are electrically connected to the output terminal of the second comparator, wherein a second terminal of the fifth resistor is electrically connected to the second terminal of the fourth comparison resistor, wherein a first terminal of the sixth resistor is electrically connected to the negative phase input terminal of the second comparator, and wherein a second terminal of the sixth resistor is electrically connected to the output terminal of the intrinsically safe energy limiting module; and wherein the third comparison unit further comprises a third pull-up resistor, a seventh resistor and an eighth resistor, wherein a first terminal of the third pull-up resistor is electrically connected to the first voltage signal input terminal, wherein a second terminal of the third pull-up resistor and a first terminal of the seventh resistor are electrically connected to the output terminal of the third comparator, wherein a second terminal of the seventh resistor is electrically connected to the second terminal of the sixth comparison resistor, wherein a first terminal of the eighth resistor is electrically connected to the negative phase input terminal of the third comparator, and wherein a second terminal of the eighth resistor is electrically connected to the output terminal of the intrinsically safe energy limiting module.

9. A bidirectional transmission circuit for a universal signal, comprising a power supply module and a bidirectional transmission module, wherein:

the bidirectional transmission module comprises an intrinsically safe energy limiting module, a first signal coupling module, an isolation transformer module, a second signal coupling module and a control module;

the first signal coupling module is electrically connected to the intrinsically safe energy limiting module and the isolation transformer module, respectively;

the second signal coupling module is electrically connected to the isolation transformer module and the control module, respectively;

the power supply module is electrically connected to the intrinsically safe energy limiting module, the first signal coupling module, the second signal coupling module and the control module;

the intrinsically safe energy limiting module comprises a control signal receiving terminal and at least one universal signal input terminal, the control signal receiving terminal is configured to receive a control signal, and each of the at least one universal signal input terminal is configured to input a universal signal;

the control module comprises a control signal output terminal and a universal signal receiving terminal, the control signal output terminal is configured to output the control signal, and the universal signal receiving terminal is configured to receive the universal signal;

the first signal coupling module is configured to adjust a first direct current signal of the universal signal to be a first alternating current signal, the isolation transformer module is configured to transmit the first alternating current signal to the second signal coupling module in an isolation manner, and the second signal coupling module is configured to adjust the first alternating current signal to be a second direct current signal and transmit the second direct current signal to the universal signal receiving terminal;

the second signal coupling module is further configured to adjust a third direct current signal of the control signal to be a second alternating current signal, the isolation transformer module is further configured to transmit the second alternating current signal to the first signal coupling module in an isolation manner, and the first signal coupling module is further configured to adjust the second alternating current signal to be a fourth direct current signal and transmit the fourth direct current signal to the control signal receiving terminal;

the bidirectional transmission circuit further comprises a signal identification module;

the signal identification module is arranged in parallel with the first signal coupling module;

wherein the signal identification module comprises at least two comparison units; and a negative phase input terminal of each of the at least two comparison units is electrically connected to an output terminal of the intrinsically safe energy limiting module, and reference signals input to positive phase input terminals of any two comparison units are different.

10. The bidirectional transmission circuit according to claim 9, wherein:

the first signal coupling module comprises a first filtering unit, a first alternating current-direct current conversion unit and a direct current-alternating current conversion unit;

the second signal coupling module comprises a second filtering unit, a second alternating current-direct current conversion unit and the direct current-alternating current conversion unit;

the first filtering unit and the second filtering unit are each configured to filter the universal signal and the control signal;

the first alternating current-direct current conversion unit is configured to adjust the second alternating current signal to be the fourth direct current signal and transmit the fourth direct current signal to the control signal receiving terminal;

the second alternating current-direct current conversion unit is configured to adjust the first alternating current signal to the second direct current signal and transmit the second direct current signal to the universal signal receiving terminal; and the direct current-alternating current conversion unit is configured to adjust the first direct current signal of the universal signal to be the first alternating current signal and adjust the third direct current signal of the control signal to be the second alternating current signal.

11. The bidirectional transmission circuit according to claim 10, wherein:

the first filtering unit comprises a first capacitor and a second capacitor, a first terminal of the first capacitor is electrically connected to each of the at least one universal signal input terminal, and a second terminal of the first capacitor is electrically connected to the control signal receiving terminal;

a first terminal of the second capacitor is electrically connected to each of the at least one universal signal input terminal, and a second terminal of the second capacitor is electrically connected to the control signal receiving terminal;

the first alternating current-direct current conversion unit comprises a third capacitor and a fourth capacitor;

the direct current-alternating current conversion unit comprises a first inductor, a second inductor, a fifth capacitor, a first diode, a second diode, a first transistor and a second transistor;

a first terminal of the third capacitor is electrically connected to each of the at least one universal signal input terminal, a first terminal of the first transistor, a control terminal of the first transistor and an anode of the first diode;

a second terminal of the third capacitor is electrically connected to a first terminal of the fourth capacitor and a first terminal of the isolation transformer module;

a second terminal of the fourth capacitor is electrically connected to the control signal receiving terminal, a first terminal of the second transistor, a control terminal of the second transistor, a cathode of the second diode, a first terminal of the second inductor and a first terminal of the fifth capacitor;

a first terminal of the first inductor is electrically connected to a second terminal of the isolation transformer module;

a second terminal of the first inductor is electrically connected to a second terminal of the second inductor, a second terminal of the fifth capacitor, a second terminal of the first transistor and a second terminal of the second transistor;

a cathode of the first diode is electrically connected to an anode of the second diode;

the second filtering unit comprises a third inductor, a fourth inductor, a sixth capacitor and a seventh capacitor;

a first terminal of the third inductor is electrically connected to the universal signal receiving terminal and a first terminal of the sixth capacitor;

a second terminal of the third inductor is electrically connected to a first terminal of the seventh capacitor;

a first terminal of the fourth inductor is electrically connected to the control signal output terminal and a second terminal of the sixth capacitor;

a second terminal of the fourth inductor is electrically connected to a second terminal of the seventh capacitor;

the second alternating current-direct current conversion unit comprises an eighth capacitor, a ninth capacitor, a third diode and a fourth diode;

a first terminal of the eighth capacitor is electrically connected to the second terminal of the third inductor and a cathode of the third diode;

a second terminal of the eighth capacitor is electrically connected to a first terminal of the ninth capacitor and a third terminal of the isolation transformer module;

a second terminal of the ninth capacitor is electrically connected to the second terminal of the fourth inductor and an anode of the fourth diode;

an anode of the third diode and a cathode of the fourth diode are each electrically connected to a fourth terminal of the isolation transformer module;

the direct current-alternating current conversion unit further comprises a first resistor, a second resistor, a tenth capacitor and an eleventh capacitor;

the first resistor is arranged in series between the control terminal of the first transistor and the first terminal of the first transistor;

the second resistor is arranged in series between the control terminal of the second transistor and the first terminal of the second transistor;

a first terminal of the tenth capacitor is electrically connected to a first terminal of the first resistor, and a second terminal of the tenth capacitor is electrically connected to the cathode of the first diode and the anode of the second diode, respectively; and the eleventh capacitor is arranged in series between the first terminal of the second inductor and the control terminal of the second transistor.

12. The bidirectional transmission circuit according to claim 9, wherein:

the universal signal comprises an intrinsically safe analog input signal AI, an intrinsically safe analog output signal AO, an intrinsically safe digital input signal DI and an intrinsically safe digital output signal DO;

the at least two comparison units comprise a first comparison unit, a second comparison unit, a third comparison unit and a signal decoding unit;

the first comparison unit comprises a first negative phase input terminal and a first positive phase input terminal, and the first comparison unit is configured to compare the universal signal with a first reference signal to obtain a first comparison signal and transmit the first comparison signal to the signal decoding unit;

the second comparison unit comprises a second negative phase input terminal and a second positive phase input terminal, and the second comparison unit is configured to compare the universal signal with a second reference signal to obtain a second comparison signal and transmit the second comparison signal to the signal decoding unit;

the third comparison unit comprises a third negative phase input terminal and a third positive phase input terminal, and the third comparison unit is configured to compare the universal signal with a third reference signal to obtain a third comparison signal and transmit the third comparison signal to the signal decoding unit;

the signal decoding unit is configured to determine a type of the universal signal according to the first comparison signal, the second comparison signal and the third comparison signal; and wherein the first reference signal, the second reference signal and the third reference signal are successively decreased.

13. The bidirectional transmission circuit according to claim 12, wherein:

the first comparison unit comprises a first comparator, a first comparison resistor and a second comparison resistor;

a first terminal of the first comparison resistor is electrically connected to a first voltage signal input terminal;

a first terminal of the second comparison resistor is grounded;

a second terminal of the first comparison resistor, a second terminal of the second comparison resistor and a positive phase input terminal of the first comparator are electrically connected;

a negative phase input terminal of the first comparator is electrically connected to the output terminal of the intrinsically safe energy limiting module;

an output terminal of the first comparator is electrically connected to the signal decoding unit;

the second comparison unit comprises a second comparator, a third comparison resistor and a fourth comparison resistor;

a first terminal of the third comparison resistor is electrically connected to the first voltage signal input terminal;

a first terminal of the fourth comparison resistor is grounded;

a second terminal of the third comparison resistor, a second terminal of the fourth comparison resistor and a positive phase input terminal of the second comparator are electrically connected;

a negative phase input terminal of the second comparator is electrically connected to the output terminal of the intrinsically safe energy limiting module;

an output terminal of the second comparator is electrically connected to the signal decoding unit;

the third comparison unit comprises a third comparator, a fifth comparison resistor and a sixth comparison resistor;

a first terminal of the fifth comparison resistor is electrically connected to the first voltage signal input terminal;

a first terminal of the sixth comparison resistor is grounded;

a second terminal of the fifth comparison resistor, a second terminal of the sixth comparison resistor and a positive phase input terminal of the third comparator are electrically connected;

a negative phase input terminal of the third comparator is electrically connected to the output terminal of the intrinsically safe energy limiting module;

an output terminal of the third comparator is electrically connected to the signal decoding unit; and the first voltage signal input terminal is electrically connected to the power supply module.

14. The bidirectional transmission circuit according to claim 13, wherein:

the first comparison unit further comprises a first pull-up resistor, a third resistor, a fourth resistor and a twelfth capacitor;

a first terminal of the first pull-up resistor is electrically connected to the first voltage signal input terminal;

a second terminal of the first pull-up resistor and a first terminal of the third resistor are electrically connected to the output terminal of the first comparator;

a second terminal of the third resistor is electrically connected to the second terminal of the second comparison resistor;

a first terminal of the fourth resistor is electrically connected to the negative phase input terminal of the first comparator;

a second terminal of the fourth resistor is electrically connected to the output terminal of the intrinsically safe energy limiting module;

a first terminal of the twelfth capacitor is electrically connected to a first bias voltage input terminal of the first comparator, a second terminal of the twelfth capacitor is grounded, and a second bias voltage input terminal of the first comparator is grounded;

the second comparison unit further comprises a second pull-up resistor, a fifth resistor and a sixth resistor;

a first terminal of the second pull-up resistor is electrically connected to the first voltage signal input terminal;

a second terminal of the second pull-up resistor and a first terminal of the fifth resistor are electrically connected to the output terminal of the second comparator;

a second terminal of the fifth resistor is electrically connected to the second terminal of the fourth comparison resistor;

a first terminal of the sixth resistor is electrically connected to the negative phase input terminal of the second comparator;

a second terminal of the sixth resistor is electrically connected to the output terminal of the intrinsically safe energy limiting module;

the third comparison unit further comprises a third pull-up resistor, a seventh resistor and an eighth resistor;

a first terminal of the third pull-up resistor is electrically connected to the first voltage signal input terminal;

a second terminal of the third pull-up resistor and a first terminal of the seventh resistor are electrically connected to the output terminal of the third comparator;

a second terminal of the seventh resistor is electrically connected to the second terminal of the sixth comparison resistor; and a first terminal of the eighth resistor is electrically connected to the negative phase input terminal of the third comparator, and a second terminal of the eighth resistor is electrically connected to the output terminal of the intrinsically safe energy limiting module.

15. The bidirectional transmission circuit according to claim 9, wherein:

the power supply module comprises a power supply, a voltage regulator module, a voltage converter module, a first rectifier module and a second rectifier module;

the power supply is configured to provide a direct current power signal;

the voltage regulator module is configured to stably output the direct current power signal;

the voltage converter module is configured to convert the direct current power signal into an alternating current power signal;

the first rectifier module and the second rectifier module are each configured to rectify the alternating current power signal into a direct current signal;

the first rectifier module has a first voltage, and the first rectifier module is configured to provide power for the intrinsically safe energy limiting module and the first signal coupling module; and the second rectifier module has a second voltage, and the second rectifier module is configured to provide power for the second signal coupling module and the control module.

16. The bidirectional transmission circuit according to claim 9, further comprising a signal protection module, wherein the signal protection module is arranged in series between the second signal coupling module and the control module, and the signal protection module is configured to perform electrostatic protection and surge protection on the bidirectional transmission circuit.

* * * * *